(12) United States Patent
Mitani (10) Patent No.: US 8,089,711 B2
(45) Date of Patent: Jan. 3, 2012

(54) ENGAGING MEMBER, LENS DRIVING MECHANISM, IMAGING APPARATUS, AND MANUFACTURING METHOD OF ENGAGING MEMBER

(75) Inventor: Yoshifumi Mitani, Sakai (JP)

(73) Assignee: Konica Minolta Opto, Inc., Tokyo (JP)

( * ) Notice: Subject to any disclaimer, the term of this patent is extended or adjusted under 35 U.S.C. 154(b) by 198 days.

(21) Appl. No.: 12/283,308

(22) Filed: Sep. 11, 2008

(65) Prior Publication Data

US 2009/0067070 A1 Mar. 12, 2009

(30) Foreign Application Priority Data

Sep. 12, 2007 (JP) ................... 2007-236418

(51) Int. Cl.
*G02B 7/02* (2006.01)
(52) U.S. Cl. ...................................... 359/824
(58) Field of Classification Search ........... 359/819–824
See application file for complete search history.

(56) References Cited

U.S. PATENT DOCUMENTS

| 5,305,151 | A * | 4/1994 | Kakimoto et al. ............ 359/814 |
| 7,449,815 | B2 * | 11/2008 | Sasaki ...................... 310/323.09 |
| 2007/0035858 | A1 | 2/2007 | Sasaki | |

FOREIGN PATENT DOCUMENTS

| JP | 61-56299 | 3/1986 |
| JP | 11-30794 | 2/1999 |
| JP | 2007-049878 | 2/2007 |

OTHER PUBLICATIONS

Japanese Office Action issued for JP2007-236418 mailed Sep. 13, 2011.

* cited by examiner

*Primary Examiner* — Ricky Mack
*Assistant Examiner* — Vipin Patel
(74) *Attorney, Agent, or Firm* — Brinks Hofer Gilson & Lione (57) ABSTRACT

In an engaging member 1 which holds a contact member 8 made of metal and having two contact surfaces 9 which form a recess 6 for receiving a shaft member 5 so as to be slidably displaceable on the shaft member 5 in accordance with displacement in a direction of the axis of the shaft member 5, a holding groove 12 is formed for exposing at least either end of a back side of the contact surface 9 of the contact member 8 in a direction of the axis of the shaft member 5, and not for exposing a central section of a back side of the contact surface 9 of the contact member 8 in the axial direction. As a result, it becomes possible to hold the contact member 8 in the manufacturing process, so that the contact surface 9 is accurately positioned.

11 Claims, 10 Drawing Sheets

ENGAGING MEMBER, LENS DRIVING MECHANISM, IMAGING APPARATUS, AND MANUFACTURING METHOD OF ENGAGING MEMBER

This application is based on application No. 2007-236418 filed in Japan, the contents of which are hereby incorporated by reference.

BACKGROUND OF THE INVENTION

The present invention relates to an engaging member, a lens driving mechanism, an imaging apparatus, and a manufacturing method of an engaging member.

In driving devices which reciprocate a shaft member in a axial direction by expansion and contraction of a piezoelectric element so as to slidably move an engaging member which engages with the shaft member by frictional force as disclosed in US2007/035858A1 (counterpart application of JP2007-49878A), it is necessary to keep the engagement state between the shaft member and the engaging member constant in order to stabilize drive performance. In the case of downsizing the driving device in particular, the engagement length of the shaft member and the engaging member is shortened, which tends to cause deteriorated drive performance by the influence of wear of the engagement face and the like.

One of the solutions for this problem is to form a lens mounting rim (holding frame) with metal, though this increases the mass of the lens mounting rim, thereby causing decreased driving force and impact resistance.

In the frictional engagement type driving device for driving a lens by friction engagement method disclosed in US2007/035858A1, a contact surface of an engaging member which comes into contact with a shaft member comprises a member made of metal in order to stabilize the friction engagement force.

As shown in US2007/035858A1, when the contact surface is constituted from a member made by bending a metal plate, a margin of error in bending angle of the metal plate becomes large. Consequently, when the metal plate is bonded with adhesives, the metal plate may lose touch with the engaging member, and when the metal plate is inserted in a mold for molding of the engaging member, the metal plate may lose touch with the mold, which makes it difficult to secure the precision of the contact surface.

In the case of constituting a small-size lens driving mechanism in particular, the displacement in fixing the metal plate and the bending error of the metal plate deflect the optical axis of a lens to a large degree, which causes deteriorated optical performance.

In insertion-molding of the bearing surface of a bearing which holds the shaft by a V-shaped groove, inclination and deflection of the bearing surface can also pose a problem in a similar manner.

SUMMARY OF THE INVENTION

In view of the problem, it is an object of the present invention to provide an engaging member having a high-precision contact surface which comes into contact with a shaft member, accurate lens driving mechanism and imaging apparatus, as well as a manufacturing method of the high-precision engaging member.

In order to accomplish the above object, an engaging member of the invention includes a contact member made of metal and having two contact surfaces which form a recess for receiving a shaft member, and a groove formed for exposing at least either end of a back side of the contact surface of the contact member in a direction of the axis of the shaft member, and not for exposing a central section of a back side of the contact surface of the contact member in the axial direction.

BRIEF DESCRIPTION OF THE DRAWINGS

These and other objects and features of the present invention will become apparent from the following description taken in conjunction with the preferred embodiments thereof with reference to the accompanying drawings, in which.

DETAILED DESCRIPTION OF THE PREFERRED EMBODIMENTS

Figure 1:
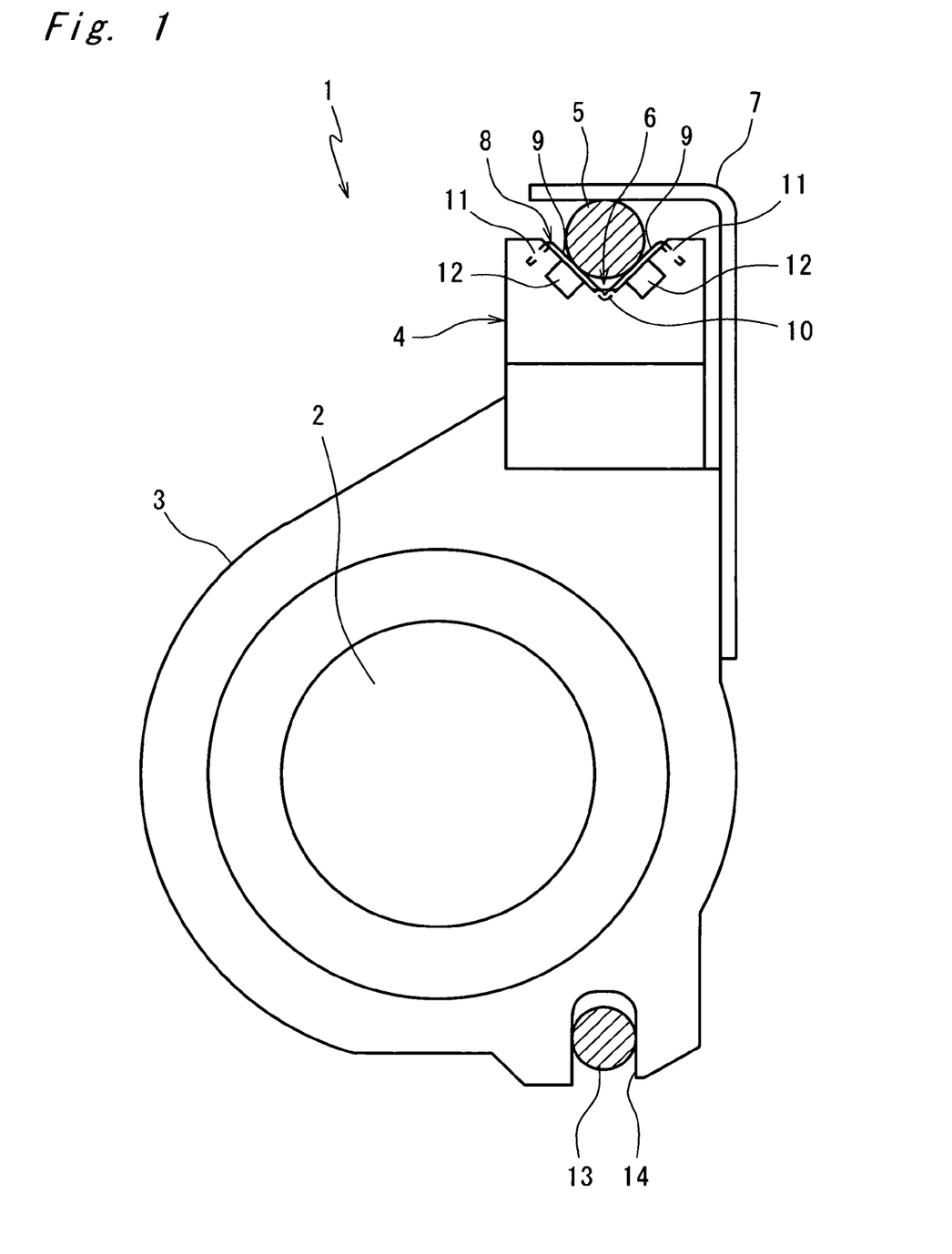
FIG. 1 is a front view of a lens mounting rim in a first embodiment of the invention.

FIG. 1 shows a lens mounting rim 1 in a first embodiment of the present invention. The lens mounting rim 1 is an engaging member which is formed by resin-molding a lens holding section 3 for holding a lens 2 integrally with an engagement section 4 and which engages with a shaft member 5 that is parallel to the optical axis of the lens 2.

The lens mounting rim 1 has a recess 6 formed in the engagement section 4 in the form of a V-shaped groove for receiving a shaft member 5 and has a pressing member 7 for pressing the shaft member 5 into the recess 6.

Figure 2:
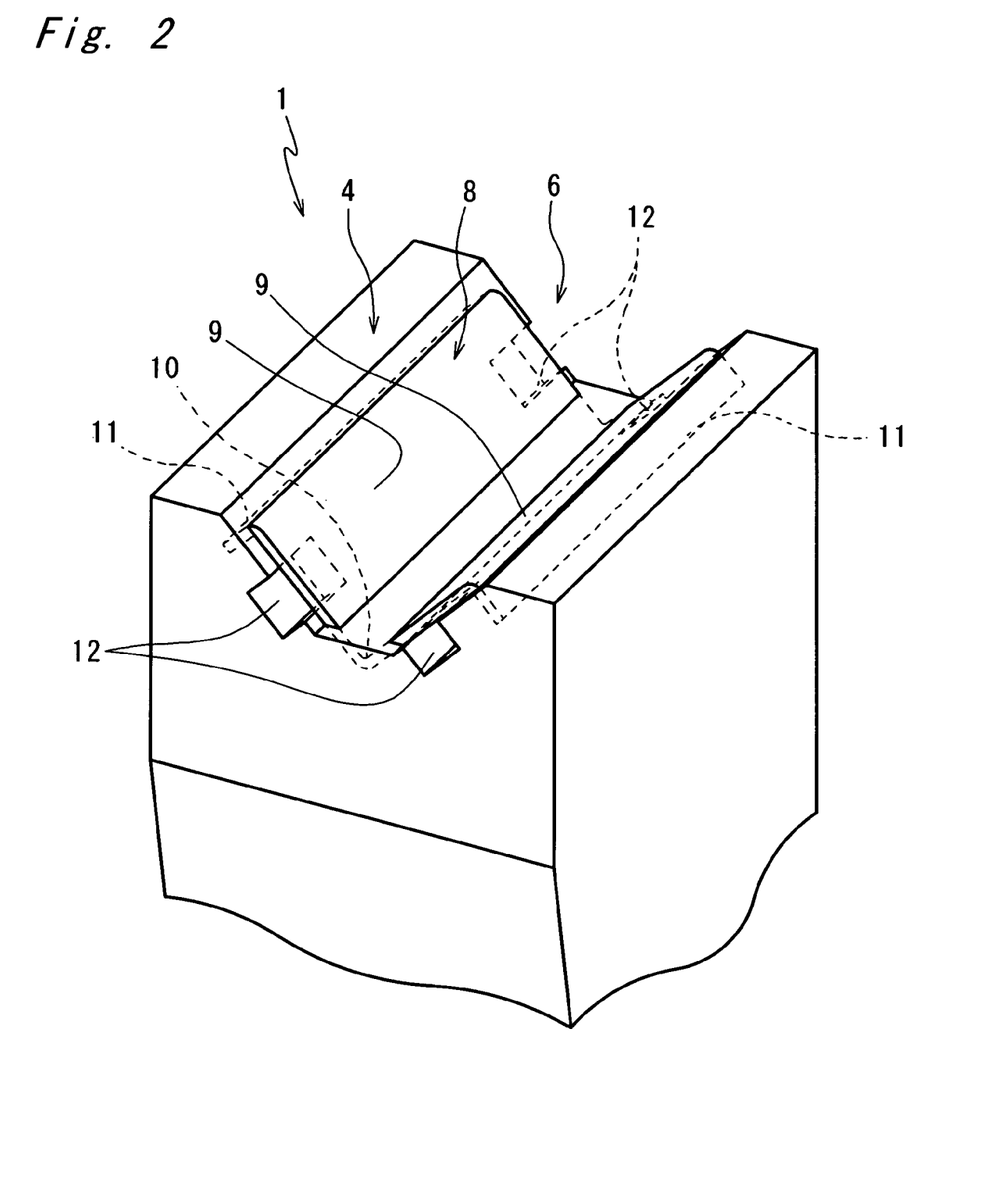
FIG. 2 is an enlarged perspective view of an engagement section of the lens mounting rim of FIG. 1.

As shown more in detail in FIG. 2, the lens mounting rim 1 is formed by insertion-molding of a contact plate 8, which is formed by bending a metal plate, into the recess 6. The contact plate 8 is exposed to the surface of the recess 6 so as to form two contact surfaces 9 which are brought into pressure contact with the shaft member 5, with a bend portion 10 which connects the two contact surfaces 9 and an embedded section 11 formed by bending respective outer sides of the two contact surfaces 9 being embedded in the resin of the engagement section 4. The engagement section 4 also has a holding groove 12 formed so as to expose the back side of both the axial ends of a portion of the contact member 8 which comes into contact with the shaft member 6.

As shown in FIG. 1, the lens mounting rim 1 also has a sliding groove 14 which engages with a guiding shaft 13 placed in parallel with the shaft member 5.

Figure 3:
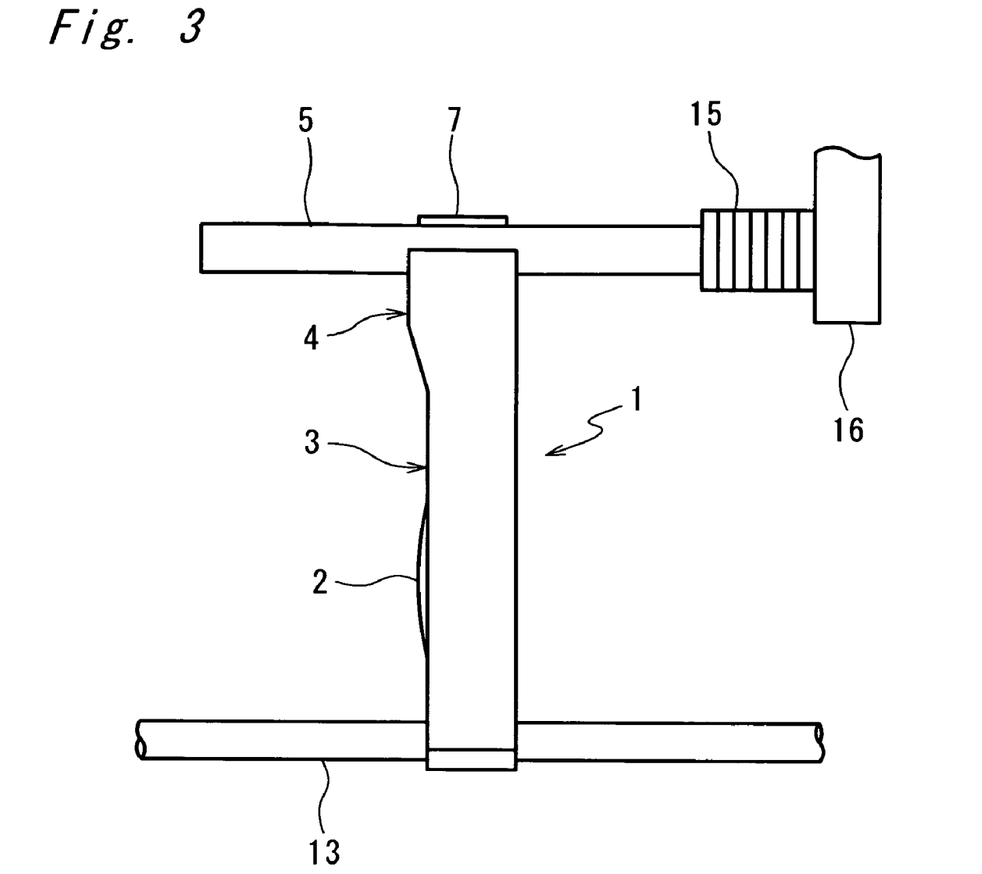
FIG. 3 is a side view of a lens driving mechanism including the lens mounting rim of FIG. 1.

As shown in FIG. 3, one end of the shaft member 5 is fixed to one end of an expansion and contraction direction of a piezoelectric element (electromechanical transducer) 15, and the other end of the piezoelectric element 15 is fixed to an immovable fixing section 16. Thus, the shaft member 5 reciprocates in the axial direction in response to expansion and contraction of the piezoelectric element 15.

When the piezoelectric element 15 expands slowly, the lens mounting rim 1 moves together with the shaft member 5 while engaging with the shaft member 5, whereas when the piezoelectric element 15 expands or contracts rapidly, the lens mounting rim 1 stays in place due to its own inertial force and slidably moves with respect to the shaft member 5. In short, the lens mounting rim 1, the shaft member 5 and the piezoelectric element 15 constitute a lens driving mechanism which drives the lens 2 in an optical axis direction.

Figure 4:
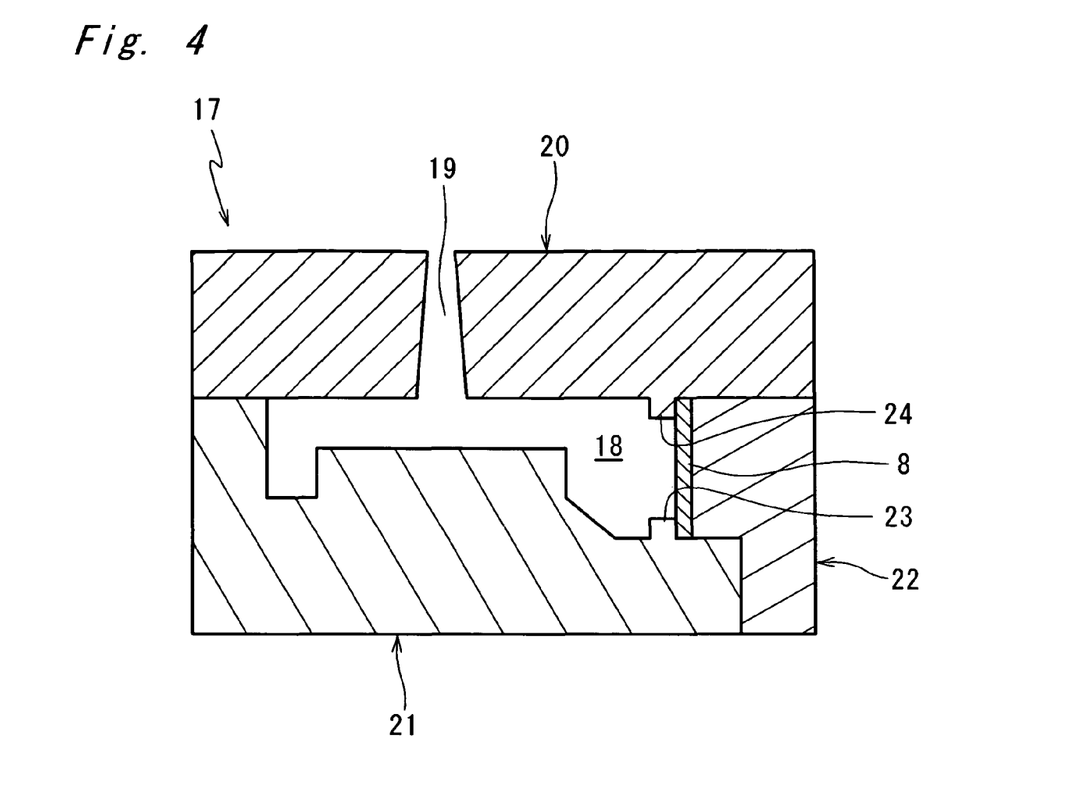
FIG. 4 is a schematic cross sectional view showing the configuration of a mold for molding the lens mounting rim of FIG. 1.

Description is now given of the method for inserting the contact member 8 and resin-molding the lens mounting rim 1. The lens mounting rim 1 is molded by injecting resin into a cavity 18 of a mold 17 from a gate 19 as shown in FIG. 4. The mold 17 is divided into a fixed mold 20, a movable die 21 held so as to be removable from the fixed mold 20, and a slide core 22 inserted into the movable die 21 in a direction perpendicular to the moving direction of the movable die 21. The fixed mold 20 and the movable die 21 respectively have holding projections 23 and 24 formed so as to correspond to the holding groove 12 and to project toward the inside of the cavity 18.

In molding the lens mounting rim 1, first, the slide core 22 is made to hold the contact member 8 in the state where the mold is open. The contact member 8 may be sucked, for example, by vacuum or other means, or may be held by a holding frame of some sort. Next, the slide core 22 and the movable die 21 are closed to seal the cavity 18, while the contact member 8 is placed in between the holding projection 24 of the fixed mold 20 and the slide core 22.

At this point, the contact member 8 is pressed onto the slide core 22 by the holding projections 23, 24, and thereby the shape of the contact member 8 is corrected so that the contact surface 9 may be in close contact with the slide core 22. Since the contact plate 8 is formed by bending a metal plate, there are variations in bending angle, flatness of the contact surface and the like. However, the contact plate 8 is placed in between the slide core 22 and the holding projections 23, 24, so that the mold shape of the slide core 22 is transferred onto the contact plate 8, which provides the contact plate 8 with the shape as designed. In this state, resin is injected from the gate 19 into the cavity 18, by which the lens mounting rim 1 can be molded so that the lens 2 and the contact surface 9 may gain the physical relationship strictly as designed.

The holding projections 23 and 24 should preferably be placed on the back side of a portion of the contact surface 9 of the contact member 8 which comes into contact with the shaft member 5. In this way, since both the ends of the contact member 8 in the direction of the axis of the shaft member 5 are held in the mold at the time of insertion molding, the contact member 8 is in close contact with the slide core 22 at least on both the ends and thereby reproduces the shape as designed. Even if the central section of the contact member 8 in the axial direction may lose touch with the slide core 22 and is dented, the central section does not project from the slide core 22. Therefore, although the central section of the contact member 8 is dented, both the ends placed at accurate positions come into contact with the shaft member 5, which prevents inclination and deflection of the contact member 8 and the shaft member 5 from occurring.

Figure 5:
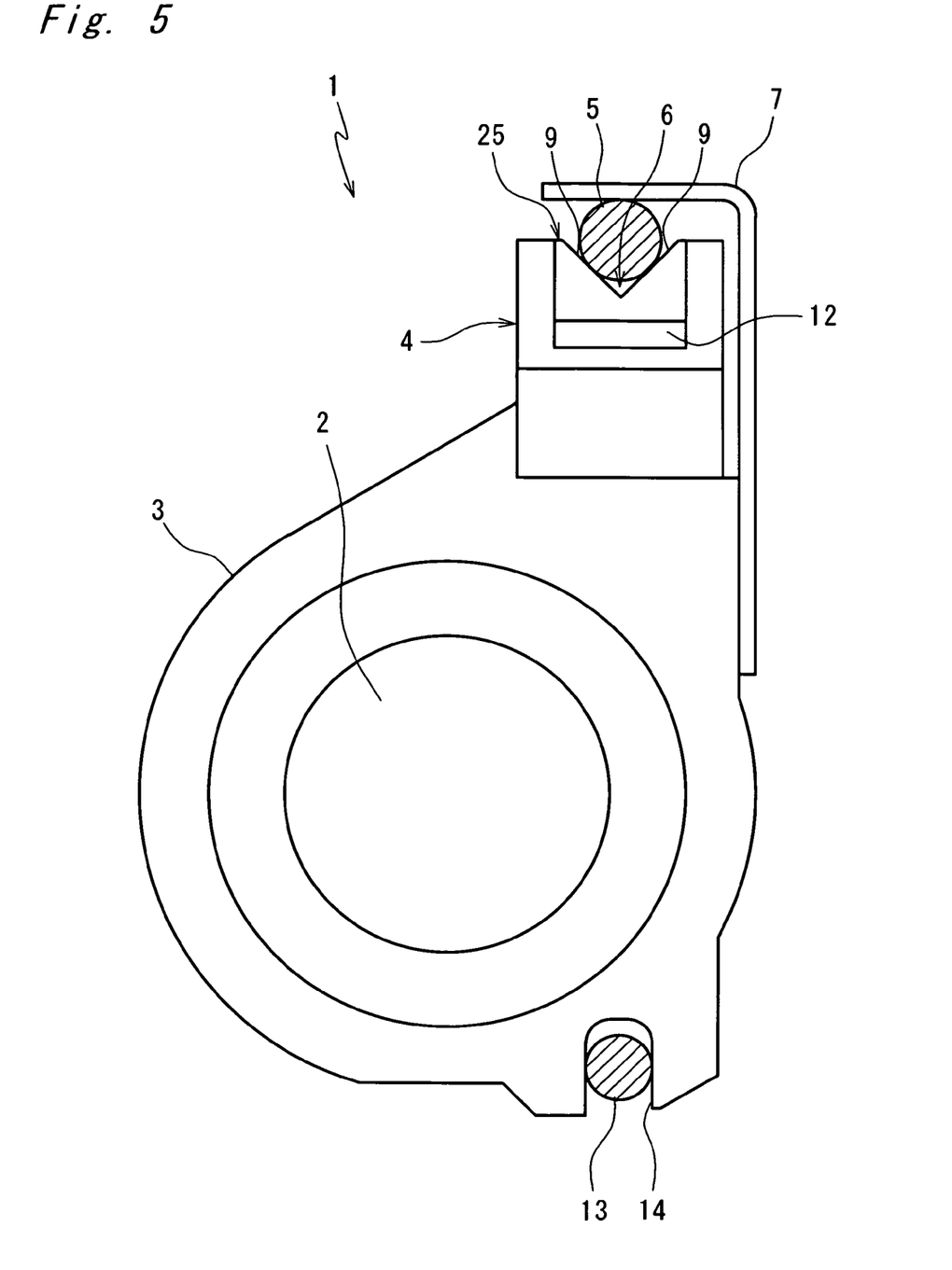
FIG. 5 is a front view of a lens mounting rim in a second embodiment of the invention.

Further, FIG. 5 shows a lens mounting rim 1 in a second embodiment of the present invention. In the following description, component members identical to those in the first embodiment are designated by identical reference numerals to omit further explanation.

In the present embodiment, a massive (block-like) contact member 25 having a recess 6 in the form of a V-shaped groove having two contact surfaces 9 which come into contact the shaft member 5 is bonded to an engagement section 4 with adhesives.

Figure 6:
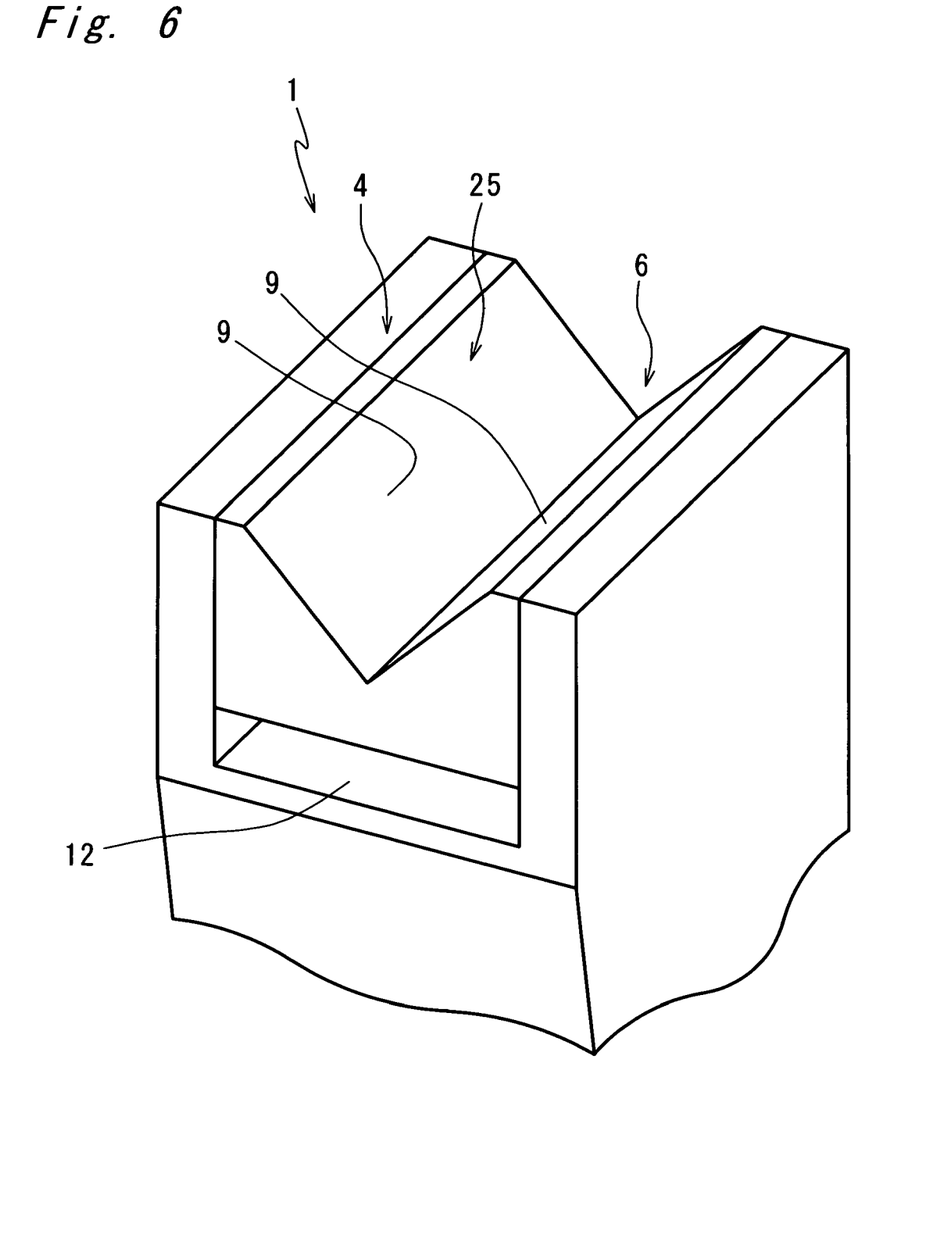
FIG. 6 is an enlarged perspective view of an engagement section of the lens mounting rim of FIG. 5.

As shown in FIG. 6 in detail, the engagement section 4 has a holding groove 12 formed for exposing both ends in the direction of the axis of the shaft member 5, i.e., both the ends of a bottom face that is the back side of the contact surface 9 of the contact member 25.

Figure 7:
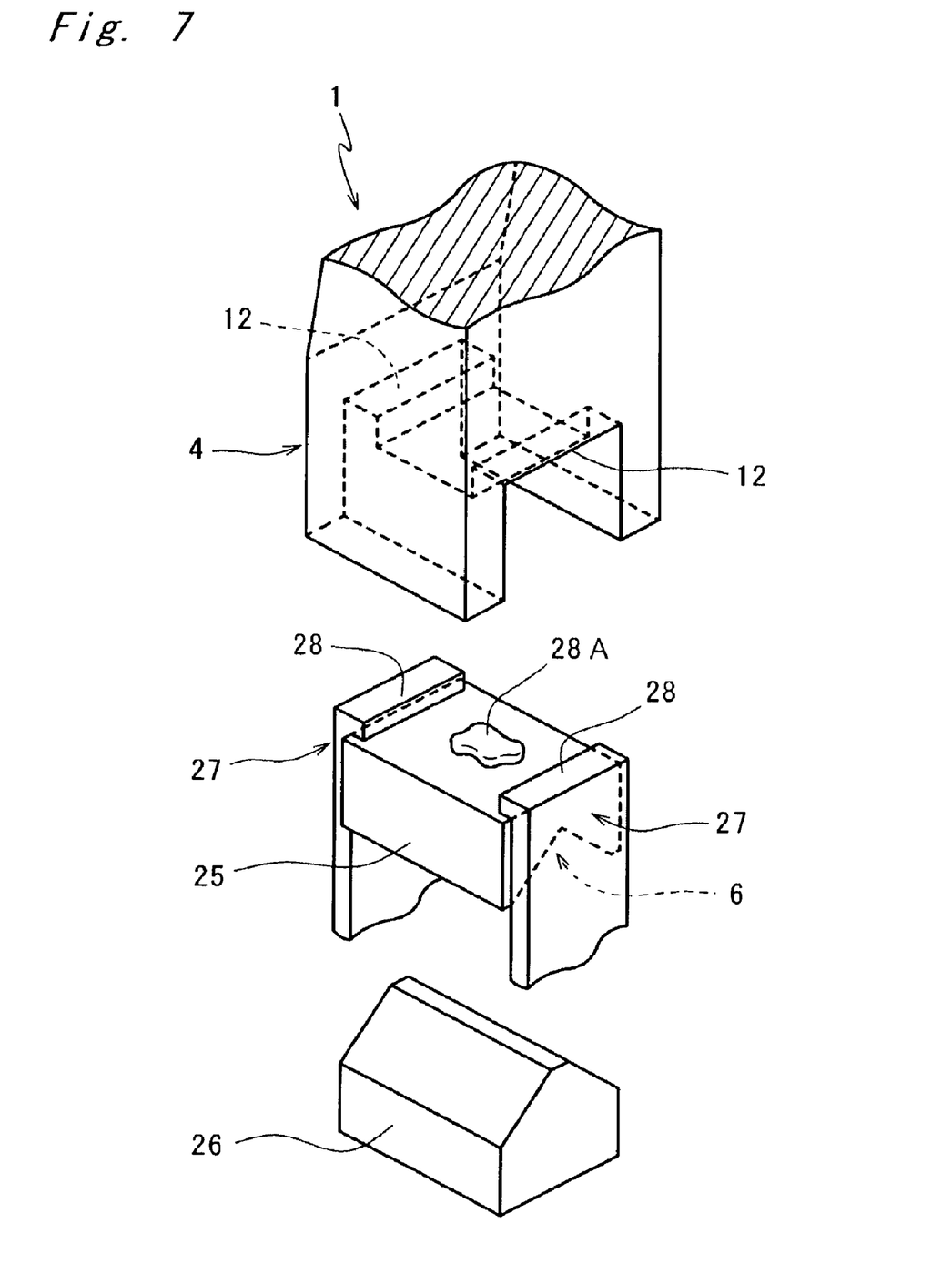
FIG. 7 is an exploded perspective view showing an assembly process of the lens mounting rim of FIG. 5.

FIG. 7 shows the step of bonding the contact member 25 to the engagement section 4 of the lens mounting rim 1. As show in the drawing, in assembly process of the present embodiment, the contact member 25 is mounted on a jig 26 having a protruding shape which fits into the recess 6 of the contact member 25 and which can come into close contact with the two contact surfaces 9. A holder 27 is then placed on both axial sides of the contact member 25, and a holding claw 28 of the holder 27 is put on the back face of the contact member 25 so as to press the contact member 25 toward the jig 26.

In this state, adhesives 28A are applied to the central section on the back face of the contact member 25 and thereby the engagement contact member 25 while the engagement section 4 is bonded to the lens mounting rim 1 is held. Since the holding claw 28 of the holder 27 can fit into the holding groove 12 formed in the engagement section 4, the engagement section 4 can be bonded while the contact member 25 is accurately positioned on the jig 26. Strict management of the physical relationship between the jig 26 and the lens holding section 3 allows the engagement section 4 to be bonded so that the shaft member 5 which comes into contact with the two contact surfaces 9 and the lens 2 may be parallel with each other and be placed away from each other at a predetermined interval. It is to be noted that adhesives may be injected into the holding groove 12 after the contact member 25 is bonded so as to enhance adhesive strength.

Figure 8:
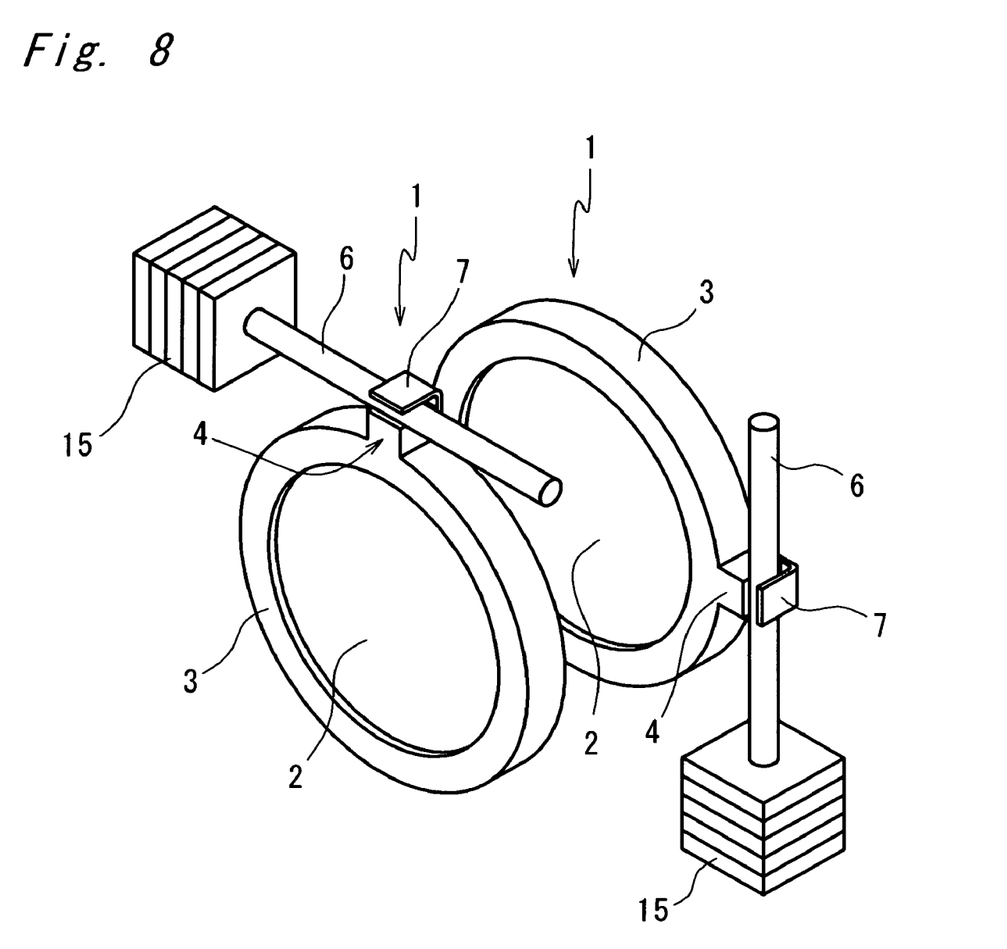
FIG. 8 is a perspective view of a hand shake correction mechanism in a third embodiment of the invention.

If the direction of the axis of the shaft member 5 received in the recess 6 of the engagement section 4 is made perpendicular to the optical axis of the lens 2 as in the lens mounting rim 1 in the third embodiment of the invention shown in FIG. 8, it becomes possible to implement other functions such as hand shake correction mechanisms which move the lens 2 to adjust an image forming position.

Figure 9:
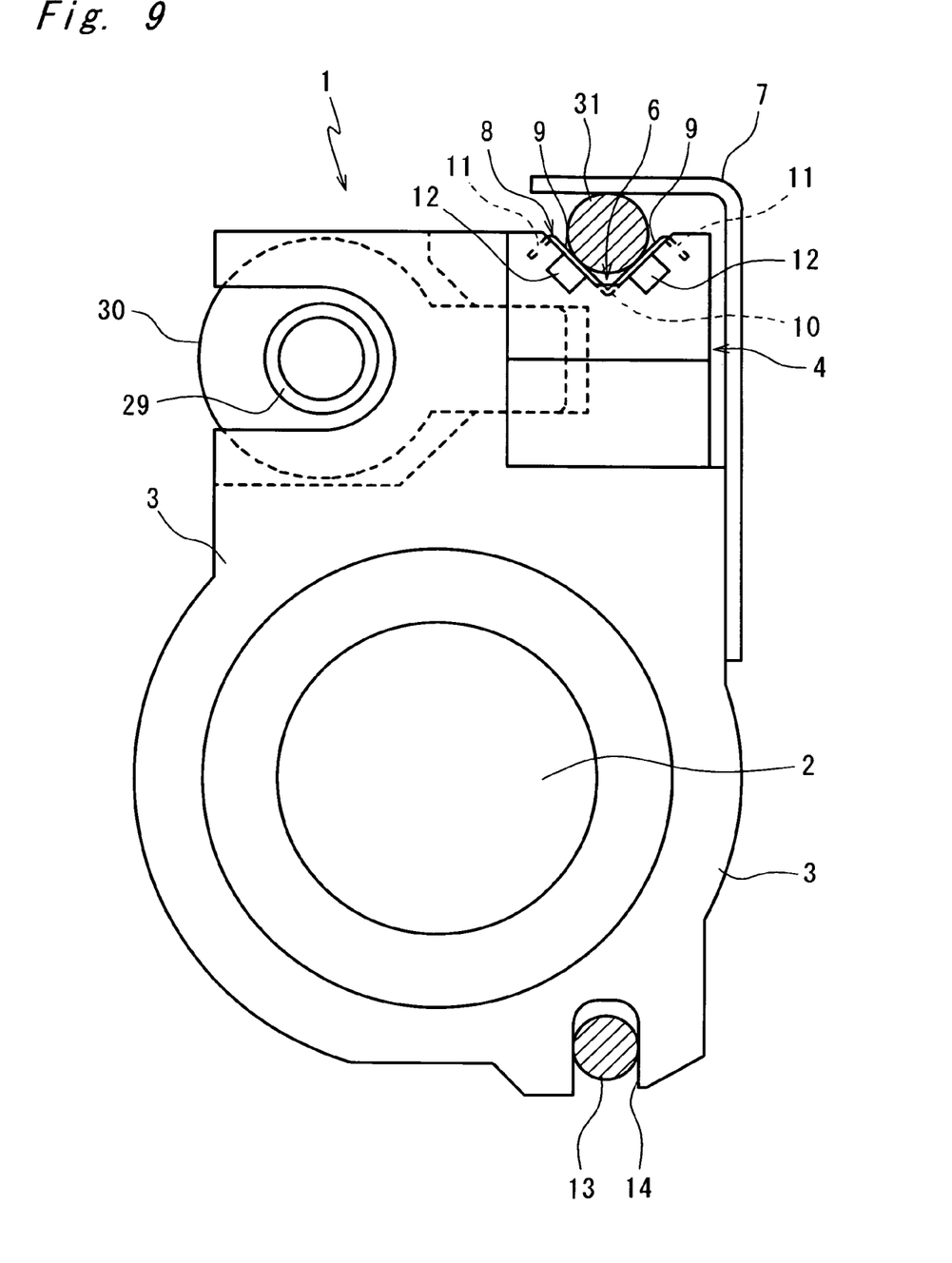
FIG. 9 is a front view of a lens mounting rim in a fourth embodiment of the invention.

Moreover, in a lens mounting rim 1 which has a nut 30 having a screw hole 29 and which is screw-fed by a feed screw (unshown) screwed in the screw hole 29 as in the fourth embodiment of the invention shown in FIG. 9, a contact member 8 forming a recess 6 which slidably engages with a guiding shaft 31 is provided so that the lens mounting rim 1 can accurately be guided in the optical axis direction of the lens 2.

With the supporting structure of the guiding shaft 31 in the present embodiment, a resin section around the hole (particularly above the guiding shaft 31 in FIG. 9) is not necessary as compared with the structure supported by the hole, and therefore the size of the lens mounting rim 1 can be decreased (in vertical direction in FIG. 9). Since a portion which comes into sliding contact with the guiding shaft 31 is metal, durability is enhanced.

Figure 10:
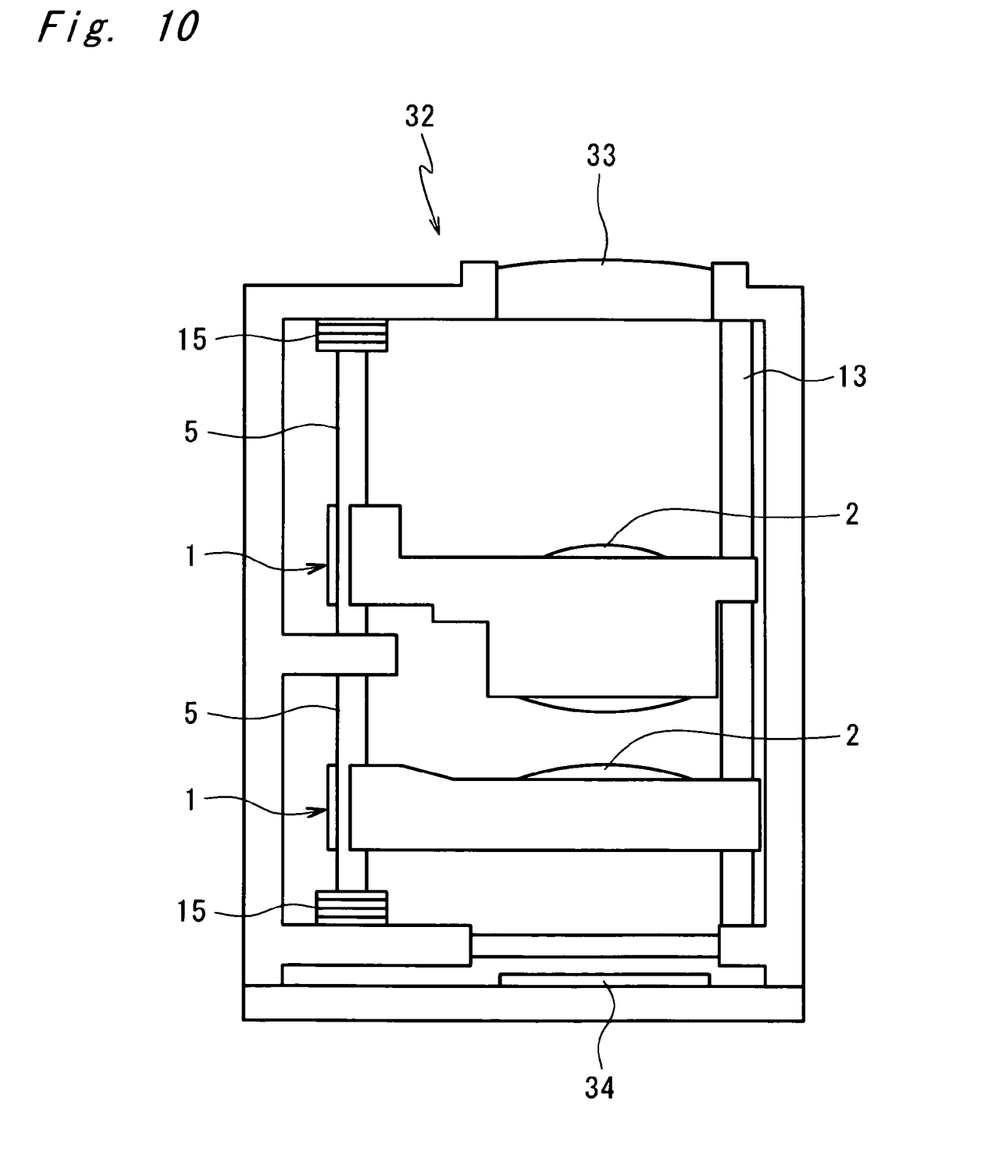
FIG. 10 is a schematic view of a camera unit having a lens mounting rim of the invention.

Moreover, as with a camera unit 32 shown in FIG. 10, placing the lens mounting rim 1 in the first or second embodiment in an optical path between an objective lens 33 and an image sensor 34 makes it possible to provide a small-size imaging apparatus which can achieve accurate and smooth zooming and focusing.

As illustrated above, an engaging member of the present invention includes a contact member made of metal and having two contact surfaces which form a recess for receiving a shaft member, and a groove formed for exposing at least either end of a back side of the contact surface of the contact member in a direction of the axis of the shaft member, and not for exposing a central section of a back side of the contact surface of the contact member in the axial direction.

According to this configuration, when the contact member is bonded to the engaging member, or when the contact member is inserted into a mold to mold the engaging member, a holding claw and the like can be inserted in the holding groove to press the contact member so that the position and inclination of the contact member can accurately be regulated. This makes it possible to provide the contact surface with high dimensional precision and to achieve precise engagement with the shaft member.

In the engaging member of the invention, the holding groove may be formed on each back side of the two contact surfaces.

In the engaging member of the invention, the holding groove may expose both ends of the back side of the contact surface of the contact member in a direction of the axis of the shaft member.

According to the configuration, high precision is realizable by directly correcting a portion of the contact member which comes into contact with the shaft member.

In the engaging member of the invention, the holding groove may expose the back side of a portion of the contact surface which comes into contact with the shaft member.

According to the configuration, a portion of the contact member which comes into contact with the shaft member can accurately be positioned, so that the accuracy of engagement with the shaft member is enhanced.

The engaging member of the invention may also include a pressing member for putting the shaft member in pressure contact with the recess so as to come into frictional engagement with the shaft member, wherein the engaging member may be slidably displaceable on the shaft member in accordance with displacement in the direction of the axis of the shaft member.

According to the configuration, it becomes possible to provide the contact surface with high dimensional precision and to achieve precise engagement with the shaft member, so that frictional force is stabilized, thereby allowing the engaging member to move constantly on the shaft member.

In the engaging member of the invention, the contact member may be formed by bending a plate material.

According to the configuration, it becomes possible to form the contact member at low costs.

In the engaging member of the invention, the contact member may be a massive member having the recess formed therein.

According to the configuration, it becomes possible to further enhance the rigidity and the precision of the contact member.

The engaging member of the invention may be formed integrally with a lens mounting rim for holding a lens.

According to the configuration, the lens can accurately be positioned with respect to the shaft member.

A lens driving mechanism of the invention includes the engaging member, the shaft member, a pressing member for putting the shaft member in pressure contact with the recess, and an electromechanical transducer which reciprocates the shaft member in a axial direction by expanding and contracting movement.

According to the configuration, it becomes possible to drive the lens with sufficient accuracy.

In the lens driving mechanism of the invention, the direction of the axis of the shaft member may be generally parallel to an optical axis of the lens.

According to the configuration, it becomes possible to constitute high-precision zoom mechanism and focusing mechanism.

In the lens driving mechanism of the invention, the direction of the axis of the shaft member may be generally at right angles to an optical axis of the lens.

According to the configuration, it becomes possible to constitute a high-precision hand shake correction mechanism.

An imaging apparatus in the present invention includes the lens driving mechanism.

According to the configuration, it becomes possible to achieve both the downsizing and the higher performance of the imaging apparatus.

According to the invention, there is provided a manufacturing method of an engaging member which comes into frictional engagement with a shaft member and which is slidably displaceable on the shaft member in accordance with displacement in a direction of the axis of the shaft member, comprising the steps for pressing a contact member made of metal and having two contact surfaces which form a recess for receiving the shaft member, toward a jig which is fitted into the recess and holding the contact member therein by putting a holding claw on a back side of the contact surface of the contact member at their either or both end in a direction of the axis of the shaft member; and positioning and bonding an engagement section having a holding groove formed for receiving the holding claw onto the contact member pressed toward the jig by the holding claw.

According to this method, the engagement section is bonded in the state where the contact member is pressed to the jig by a holder and thereby the contact surface is accurately positioned, so that the engagement section and the contact surface gain the physical relationship precisely as designed. This allows precise engagement between the engaging member and the shaft member.

According to the present invention, the engaging member has a holding groove formed for exposing an axial end on the back side of the contact surface of the contact member, and therefore when the contact member is bonded to the engaging member, or when the contact member is inserted into a mold to mold the engaging member, a holding claw and the like can be inserted in the holding groove to press the contact member so that the position and inclination of the contact member can be corrected. This makes it possible to provide the contact surface with high dimensional precision. Accordingly, the engaging member can be engaged with the shaft member with sufficient accuracy.

Although the present invention has been fully described in connection with the preferred embodiment thereof with reference to the accompanying drawings, it is to be noted that various changes and modifications are apparent to those skilled in the art. Such changes and modifications are to be understood as included within the scope of the present invention as defined by the appended claims unless they depart therefrom.

What is claimed is:
1. An engaging construction of a shaft member, comprising:
   a shaft member;
   a single-piece contact member made of metal and having first and second integrally formed sections joined at a common vertex along a longitudinal axis thereof, the first and second sections having corresponding contact surfaces which form a recess for receiving the shaft member;

an engaging member for holding the contact member, the engaging member formed with holding grooves on each back side of the corresponding contact surfaces and configured to expose a portion of the back side of the contact surface of the contact member, which is brought into contact with the shaft member;

the first and second contact sections each having a rectangular-shaped embedded section integrally formed at distal longitudinal edges, the embedded section being embedded in the engaging member; wherein the holding groove exposes the back side of the contact surface at an axial end in a direction of an axis of the shaft member, and the holding groove not exposing an axially central section.

2. The engaging construction according to claim 1, wherein the holding groove exposes both ends of back sides of the corresponding contact surfaces of the contact member in the direction of the axis of the shaft member.

3. The engaging construction according to claim 1, comprising:

a pressing member for putting the shaft member in pressure contact with the recess so as to come into frictional engagement with the shaft member, wherein the engaging member is slidably displaceable on the shaft member in accordance with axial displacement of the shaft member.

4. The engaging construction according to claim 1, wherein the contact member is formed by bending a plate material.

5. The engaging construction according to claim 1, wherein the engaging member is formed integrally with a lens mounting rim for holding a lens.

6. A lens driving mechanism, comprising:

the engaging construction according to claim 5, further including:

a pressing member for putting the shaft member in pressure contact with the recess; and an electromechanical transducer which reciprocates the shaft member in a axial direction by expanding and contracting movement.

7. The lens driving mechanism according to claim 6, wherein the direction of the axis of the shaft member is generally parallel to an optical axis of the lens.

8. The lens driving mechanism according to claim 6, wherein the direction of the axis of the shaft member is generally at right angles to an optical axis of the lens.

9. An imaging apparatus comprising the lens driving mechanism according to claim 6.

10. The engaging construction according to claim 1, wherein the common vertex connecting the first and second sections is embedded in the engaging member.

11. A manufacturing method of an engaging member which comes into frictional engagement with a shaft member and which is slidably displaceable on the shaft member in accordance with displacement in a direction of the axis of the shaft member, comprising the steps for:

pressing a contact member made of metal and having two contact surfaces, which form a recess for receiving the shaft member, toward a jig which is fitted into the recess and holding the contact member therein by putting a holding claw on a back side of the contact surface of the contact member at their either or both end in a direction of the axis of the shaft member; and positioning and bonding an engagement section having a holding groove formed for receiving the holding claw onto the contact member pressed toward the jig by the holding claw.

* * * * *